(No Model.) 2 Sheets—Sheet 1.
W. A. KNOWLTON.
HORSE HAY RAKE.
No. 290,777. Patented Dec. 25, 1883.
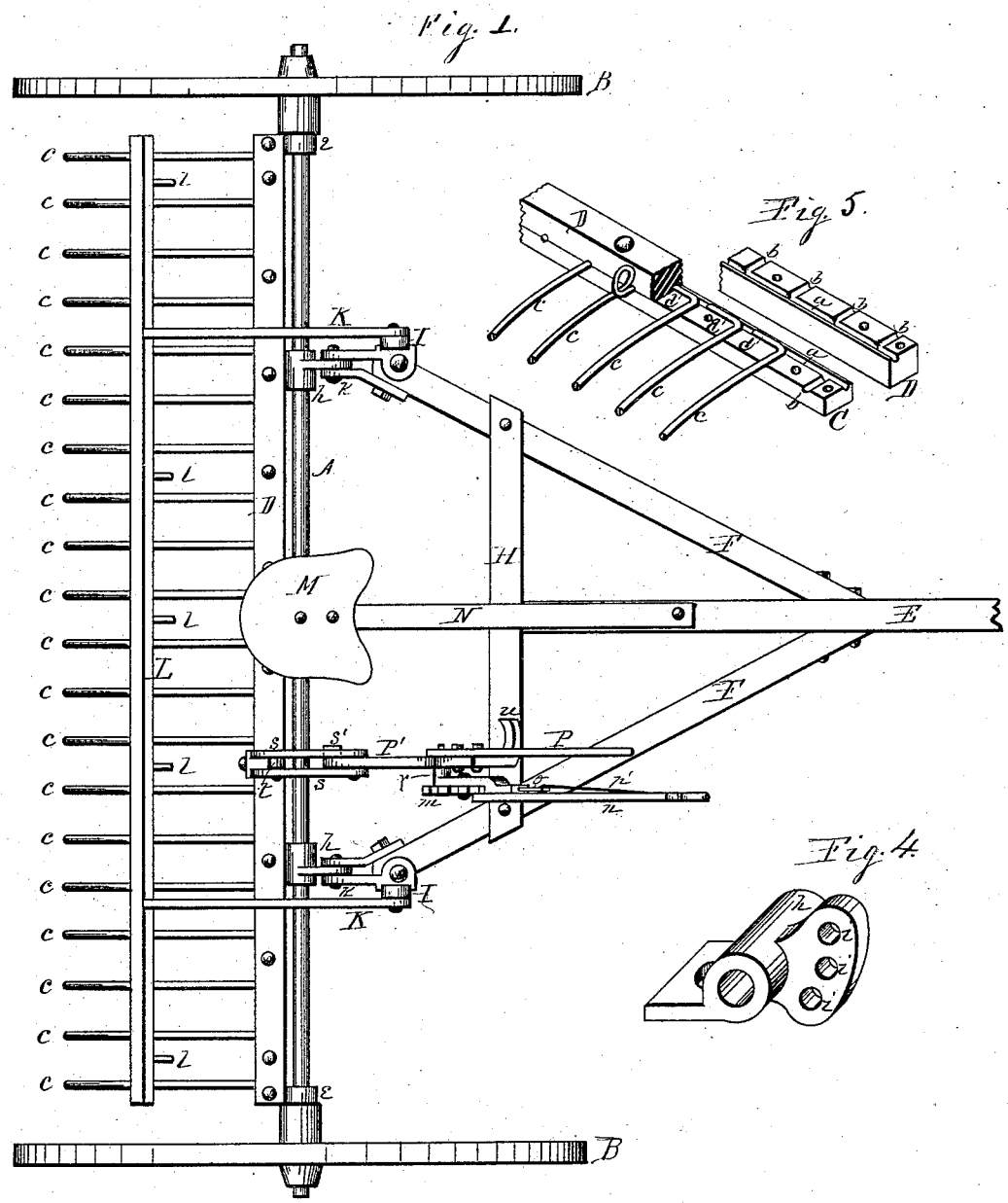

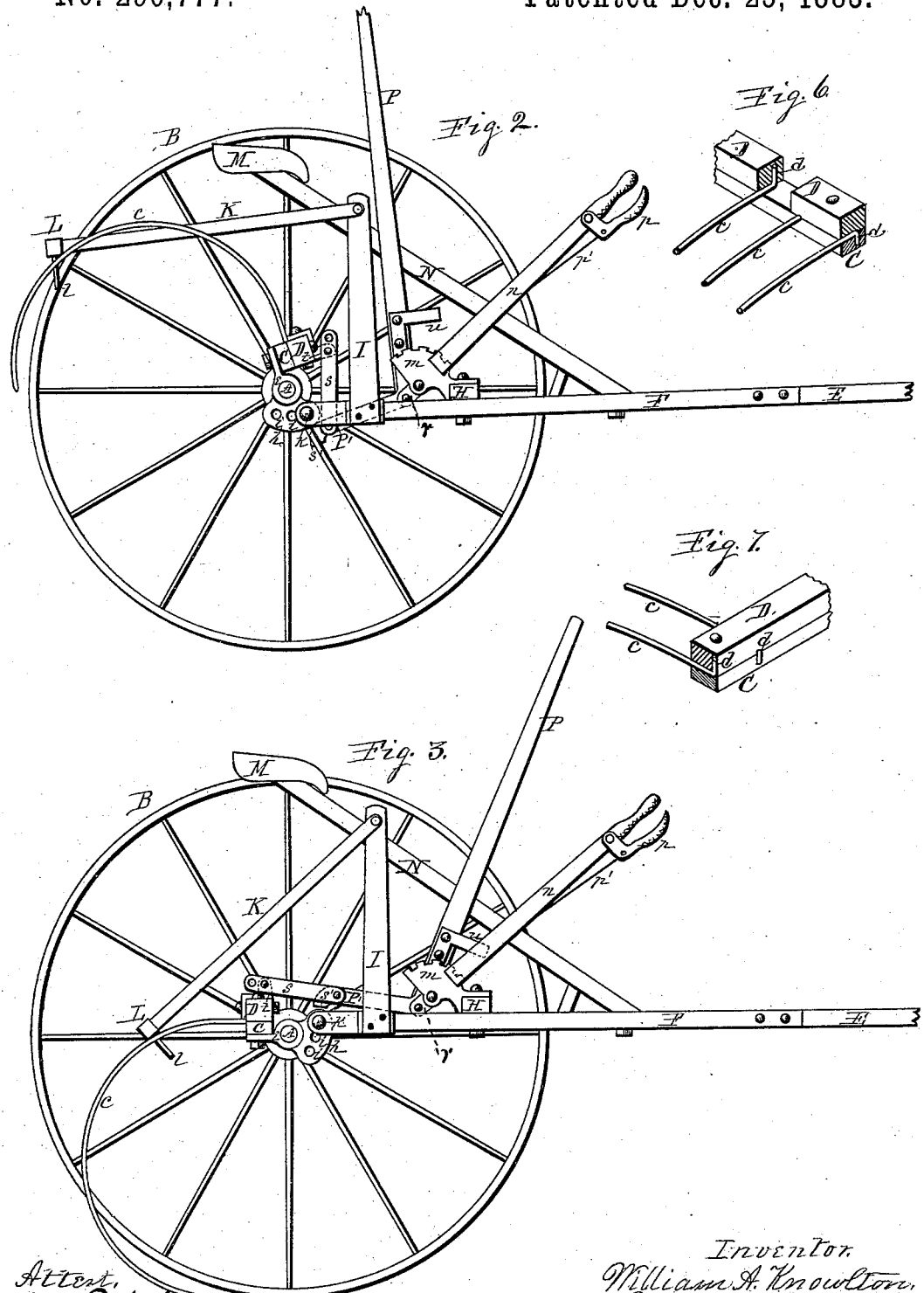

UNITED STATES PATENT OFFICE.

WILLIAM A. KNOWLTON, OF ROCKFORD, ILLINOIS.

HORSE HAY-RAKE.

SPECIFICATION forming part of Letters Patent No. 290,777, dated December 25, 1883.

Application filed May 7, 1883. (No model.)

*To all whom it may concern:*

Be it known that I, WILLIAM A. KNOWLTON, a citizen of the United States, residing in the city of Rockford, in the county of Winnebago and State of Illinois, have invented new and useful Improvements in Horse Hay-Rakes, of which the following is a specification.

This invention relates to that class of horse hay-rakes which are mounted on carrying-wheels and in which spring wire teeth are employed; and the object of this invention is to simplify the construction of this class of rakes, to lessen their cost, and to produce a machine capable of adjustments to adapt it in use to the capacity of boys or men. To accomplish these objects I have designed and constructed the rake represented in the accompanying drawings, in which—

Figure 1 is a plan view of a rake embodying my invention. Fig. 2 is a side elevation with one of the carrying-wheels omitted and the rake-teeth in elevated position for transportation. Fig. 3 is also a side elevation with one of the carrying-wheels omitted and the rake-teeth in working position. Fig. 4 is an isometrical representation of one of the draft-brackets employed to connect the rake-head, axle-tree, and tongue. Fig. 5 is an isometrical representation of a portion of the rake-head separated and portions of the teeth in place therein. Figs. 6 and 7 are isometrical representations of portions of the rake-head with portions of the teeth in place therein, showing modifications of the rake-tooth connection with the two-part rake-head.

In the figures, A represents an axle-tree, preferably of bar material, cylindrical in section, and its ends receive the carrying-wheels B, in the usual manner, to revolve thereon.

The rake-head of my improved machine is composed of two parts—a lower part, C, and an upper part, D, rectangular in section. The contiguous faces of these parts near their forward edges are provided with a lengthwise semicircular groove, $a$, and at proper intervals with transverse semicircular grooves $b$, extending from their rear edges forward and connecting with the lengthwise grooves $a$. The relative position of these several grooves in the respective parts is such that when the parts are placed together the grooves will coincide, producing tubular openings.

At $c$ are represented rake-teeth produced from suitable material, curved in the usual form, and the ends $d$ of these teeth, designed to connect with the rake-head, are bent laterally at a right angle to the main portion of the tooth. These teeth thus prepared have their bent ends placed in the rake-head in such a manner that their bent end portions, $d$, shall rest in the lengthwise groove $a$, and the contiguous end portions of the teeth to rest in the transverse grooves $d$, in which position they are securely fixed by means of sufficient clamping screw-bolts passed through the two parts of the rake-head at proper intervals, operating to clamp the parts together firmly.

In Figs. 6 and 7 I have shown modifications of my improved method of connecting the rake-teeth with the rake-head. In these examples the end of the tooth is bent either up or down, and, instead of the lengthwise semi-grooves $a$ in the rake-head, holes bored in either the upper or lower portion thereof, to connect with the transverse grooves $b$, may be employed to receive the bent ends of the rake-teeth; or, instead of the holes, suitable grooves to coincide with the transverse grooves may be formed in the forward edge of either of the portions of the rake-head, to receive the bent ends of the rake-teeth, all of which will be fully understood from an inspection of the figures, and will be within the scope of my invention.

At $e$ are represented bracket-supports, to connect the end portions of the rake-head with the axle-tree. These bracket-supports are constructed in eye form, to receive the axle-tree, on which they are placed immediately inside of the hubs of the carrying-wheels, and serve as collars, against which the wheels revolve. The rear extensions of these bracket-supports are of plate form, to receive the rake-head, which is fixed in position thereon by means of sufficient screw-bolts passed through the parts.

At $h$ are represented draft-brackets, constructed in eye form, to receive the axle-tree, on which they are placed at proper intervals. The rear extensions of these draft-brackets are of plate form, to receive and support the central portion of the rake-head, which is fixed thereto by sufficient screw-bolts passed through the parts. These rear extensions of the draft-brackets and their connections with the rake-head are in every particular the same as like parts of the end bracket-supports, e. Instead of these rear extensions on the brackets h, these parts may be fitted to support the rake-head over or above the axle-tree, or in any other suitable portion relatively therewith. The forward arms of these draft-brackets are of plate form, having a vertical position, and are provided at proper intervals with holes i, to receive suitable coupling-bolts.

At E is represented a tongue or pole of suitable dimensions, having its rear end portion fitted with hounds F, supported in their oblique portion by means of a transverse bar, H, fixed to the rear end of the tongue and to the rear portions of the hounds. The rear ends of the hounds F are fitted in clasp form, to embrace the vertical plates of the draft-brackets h, and are provided with holes to receive draft-bolts k, to connect them with the draft-brackets. By this connection of the tongue with the draft-brackets, it is capable of a vertical adjustment, which is accomplished by changing the bolt-connection of the tongue to any of the several holes in the forward plate-formed portion of the draft-bracket.

At I are represented standards of suitable dimensions, having their lower ends fixed to the clasp which connects the hounds to the draft-brackets—one on each side—in such a manner as to hold them in a vertical position relatively with the tongue.

At K are represented suitable connecting-bars, each having a pivotal connection at one end with the upper end of the standard I, and their rear ends are rigidly connected to a discharging-head, L, which is supported on the upper curved surfaces of the rake-teeth in such a manner as to rise with the upward movement of the teeth. This discharging-head is provided with arms l, depending from its under side, extending below the teeth, to engage the forward side of the hay carried by the rake-teeth, to dislodge it from the teeth when raised to deposit it in windrows.

At M is represented a driver's seat, supported in proper position over the axle-tree on an inclined support, N, fixed to the tongue forward of the axle-tree.

At m is represented a segment-ratchet, fixed to the tongue-frame in a suitable position relatively with the driver's seat.

At n is represented a regulating and holding lever, having its lower portion pivoted on the center of the segment-ratchet. This lever is provided with a spring-actuated detent or bolt, o, to engage the teeth of the ratchet. It is also provided with a thumb-lever, p, pivoted near its free handle end, and a rod or link, p', connects this thumb-lever with the bolt in such a manner that the movement of the thumb-lever will operate the bolt. An angle-formed lifting or dumping lever, consisting of the arms P and P', is pivoted at its angular point to the depending end portion, r, of the regulating and holding lever n in such a manner that its handle-arm P rises in an upright or slightly-inclined position within reach of the driver when mounted on his seat, and its position is such as to require a rearward movement of its free handle end to raise the rake-teeth to dump, unload, or discharge the hay, and its short arm P' extends rearward, having its rear end pivotally jointed between the forward ends of connecting-links s, and its extreme rear end at s' is of bent form, to engage the under edge of one or both of the connecting-links, producing a stop to limit the upward movement of these parts at their joint-connection. The rear ends of these connecting-links s have a pivotal joint-connection with an arm, t, which rises from the upper face of the rake-head, to which it is fixed by means of a suitable screw-bolt passed through its foot portion and through the rake-head.

At u is represented a pedal fixed to the lifting or dumping lever, from which it projects inward in position to receive the foot of the operator, by which to hold the lifting or dumping lever in its forward position to hold the rake-teeth in their working position.

From the foregoing it will be seen that the regulating and holding lever, its connection with the rake-head, and its pawl-connection with the segment-ratchet furnish the means by which an operator mounted upon the machine in the driver's seat will be able to adjust the rake-teeth in a proper working position. The lifting or dumping lever and its link-connection with the rake-head furnish the means by which the driver, mounted upon his seat on the machine, can lift the rake-teeth and dump, unload, or discharge the hay in windrows or at any point desired.

In the connection of the tongue with the draft-brackets forward of the axle-tree it will be seen that the weight of the driver mounted upon the seat will operate to counteract the weight of the rake, and the weight required to properly balance the machine will vary with the position of the tongue in its connection with the draft-bracket, requiring a less weight to balance the machine when the tongue is connected to the upper portion of the draft-bracket, as shown in the drawings, than when connected with the lower point thereof, and the construction of this adjustable connection is such as to adapt the machine to the weight and capacity of boys or men to render it an implement equally efficient in the hands of all classes.

In the foregoing I have represented and described my machine constructed with a tongue or pole; but instead thereof thills may be employed to produce a one-horse machine.

I claim as my invention—

1. The combination, with the draft-brackets connecting the rake-head and axle-tree, of a tongue having an adjustable connection with the draft-brackets, substantially in the manner and for the purpose set forth.

2. The combination, with a regulating and holding lever, of an upright dumping-lever having a fulcrum-connection with the regulating and holding lever and a suitable link-connection with the rake-head, substantially as and for the purpose set forth.

3. The combination, with a regulating and holding lever provided with a pawl-and-ratchet mechanism and with a rake-head, of an upright dump-lever having its fulcrum-support on the regulating and holding lever, and a link-connection with the rake-head, substantially as and for the purpose set forth.

4. The combination, with the rake-head and the regulating and holding lever, of a dumping-lever, said dumping-lever having a pivotal connection with the regulating and holding lever, a suitable link-and-stop connection with the rake-head, and a pedal, these several parts constructed and arranged to operate substantially as and for the purpose set forth.

WILLIAM A. KNOWLTON.

Witnesses:
F. P. COLLIER,
A. O. BEHEL.